(12) United States Patent
Frost et al.

(10) Patent No.: US 7,520,379 B2
(45) Date of Patent: Apr. 21, 2009

(54) CONVEYOR CHAIN PIN WITH RESERVOIR

(75) Inventors: Charles C. Frost, Ada, MI (US); Jonathan M. Rathbun, Belmont, MI (US)

(73) Assignee: Frost Links, Inc., Grand Rapids, MI (US)

( * ) Notice: Subject to any disclaimer, the term of this patent is extended or adjusted under 35 U.S.C. 154(b) by 243 days.

(21) Appl. No.: 11/707,603

(22) Filed: Feb. 16, 2007

(65) Prior Publication Data

US 2007/0193860 A1 Aug. 23, 2007

Related U.S. Application Data

(60) Provisional application No. 60/774,149, filed on Feb. 16, 2006.

(51) Int. Cl.
*B65G 17/06* (2006.01)

(52) U.S. Cl. ............... 198/851; 198/500; 198/850

(58) Field of Classification Search ........... 198/850, 198/851, 500; 474/91
See application file for complete search history.

(56) References Cited

U.S. PATENT DOCUMENTS

| | | | |
|---|---|---|---|
| 2,059,063 A | 10/1936 | Tourville | |
| 2,293,029 A | 8/1942 | Focke | |
| 2,625,830 A | 1/1953 | Transeau | |
| 2,660,898 A * | 12/1953 | Kew | 198/500 |
| 3,742,863 A | 7/1973 | Rosenberger | |
| 3,748,674 A | 7/1973 | Powell et al. | |
| 4,114,467 A | 9/1978 | Petershack | |
| 4,140,025 A | 2/1979 | Lapeyre | |
| 4,151,652 A | 5/1979 | Palma | |
| 4,195,887 A | 4/1980 | Ruddell | |
| 4,413,513 A | 11/1983 | Ross et al. | |
| 4,493,680 A | 1/1985 | Hoffmann | |
| 4,986,798 A | 1/1991 | Van Rooij et al. | |
| 5,078,654 A * | 1/1992 | Naz | 474/91 |
| 5,121,831 A | 6/1992 | Fesler | |
| 5,186,280 A | 2/1993 | Mattcheck | |
| 5,257,690 A | 11/1993 | Dehne | |

(Continued)

OTHER PUBLICATIONS

International Search Report and Written Opinion for corresponding PCT Application No. PCT/US07/04028, filed on Feb. 16, 2007.

*Primary Examiner*—Gene Crawford
*Assistant Examiner*—William R Harp
(74) *Attorney, Agent, or Firm*—Van Dyke, Gardner, Linn & Burkhart LLP

(57) ABSTRACT

A chain pin or pin element for connecting chain links together to form a section of a chain for conveying products along a conveyor line or path of a material handling system includes a shaft portion and a head portion at at least one end of the shaft portion. The shaft portion is received through respective chain links to define a joint of the section of chain, while the head portion or head portions retain the pin at the links. At least one head portion of at least some of the pins includes a reservoir and a channel formed therein. The reservoir is configured to receive a lubricating fluid, such as from a lubricating device of the material handling system, while the channel functions to distribute the lubricant from the reservoir and toward and onto the shaft portion of the pin to lubricate the joint of the chain.

20 Claims, 5 Drawing Sheets

U.S. PATENT DOCUMENTS

| | | | |
|---|---|---|---|
| 5,305,872 A | 4/1994 | Hutton | |
| 5,365,765 A | 11/1994 | Gohl et al. | |
| 5,378,205 A | 1/1995 | Gohl et al. | |
| 5,423,724 A | 6/1995 | Cole et al. | |
| 5,461,852 A | 10/1995 | Nagamatsu | |
| 5,482,154 A | 1/1996 | Affeldt et al. | |
| 5,490,590 A | 2/1996 | Courtney | |
| 5,492,215 A | 2/1996 | Affeldt et al. | |
| 5,563,392 A | 10/1996 | Brown et al. | |
| 5,966,923 A | 10/1999 | Nakamura | |
| 6,098,787 A | 8/2000 | Murano | |
| 6,138,820 A | 10/2000 | Ewert | |
| 6,161,685 A | 12/2000 | Stebnicki | |
| 6,241,080 B1 | 6/2001 | Tuomikoski | |
| 6,244,426 B1 | 6/2001 | Murano et al. | |
| 6,321,523 B1 | 11/2001 | Christmas | |
| 6,364,094 B1 | 4/2002 | Aistmar | |
| 6,419,078 B1 | 7/2002 | Leathers | |
| 6,474,464 B1 | 11/2002 | Horton et al. | |
| 6,478,115 B1 * | 11/2002 | Wech et al. | 184/15.2 |
| 6,691,862 B1 | 2/2004 | Mogens | |
| 6,746,353 B2 | 6/2004 | Albertin et al. | |
| 6,782,687 B1 | 8/2004 | Mingers | |
| 6,862,939 B2 | 3/2005 | Frost | |
| 6,938,732 B2 | 9/2005 | Garbagnati | |
| 6,978,885 B1 | 12/2005 | Schumacher | |
| 6,991,094 B2 | 1/2006 | Frost | |
| 6,993,978 B2 | 2/2006 | Frost | |
| 7,063,207 B2 | 6/2006 | Sykora | |
| 7,246,699 B2 | 7/2007 | Frost et al. | |
| 2005/0217531 A1 | 10/2005 | Waldmiller | |
| 2007/0184698 A1 | 8/2007 | Rathbun et al. | |
| 2007/0193860 A1 | 8/2007 | Frost et al. | |

* cited by examiner

CONVEYOR CHAIN PIN WITH RESERVOIR

CROSS REFERENCE TO RELATED APPLICATION

The present application claims the benefit of U.S. provisional application Ser. No. 60/774,149, filed Feb. 16, 2006 by Frost et al. for CONVEYOR CHAIN PIN WITH RESERVOIR, which is hereby incorporated herein by reference in its entirety.

FIELD OF THE INVENTION

The present invention relates generally to material handling or conveying systems and, more particularly, to pins for chains of such material handling or conveying systems.

BACKGROUND OF THE INVENTION

A material handling system typically consists of an elongated I-beam or enclosed track along which a plurality of trolleys or the like are guided and supported. The trolleys include rollers which travel along the I-beam and further include a portion extending generally downward from the rollers on which the subject material is supported. Conveyor chains function to move the trolleys or the like along the track or rail or I-beam, and typically include multiple sections or links joined together by pins or bolts to define the joints of the chain. As the chain moves along the conveying path, the chain flexes at the chain joints as the chain negotiates curves in the conveying path or track, such as lateral curves and/or upward or downward curves along the path.

Known conveyor chains typically include a center link connected at each end to a respective pair of side links by a respective pin, such that the links move or pivot about the pins as the chain flexes as it travels along the conveying path. Such relative movement of the links and pins or bolts leads to wear on the component and may eventually lead to a failure of the links and/or the pins or bolts. The chain wear may increase if the friction between the pin and the links increases, such as due to rough surfaces (such as by machining grooves, scratches or the like) of one or more of the components and/or a lack of lubrication on the components.

In order to keep the trolleys and chain operating smoothly, some form of lubricating device is typically utilized to apply a lubricating fluid to the chain. An example of such a lubricating device is described in U.S. Pat. No. 6,419,078, entitled LUBRICATING DEVICE FOR CONVEYOR SYSTEMS and assigned to Frost Links, Inc. of Mich., which is hereby incorporated herein by reference in its entirety. While a typical lubricating device may provide lubricant to the chain, the system may not adequately lubricate the joints of the chain such that the lubricant penetrates fully therein.

Therefore, there is a need in the art for an improved lubrication system and/or chain component or components that overcomes the shortcomings of the prior art.

SUMMARY OF THE INVENTION

The present invention provides a pin or pin element, such as an I-pin or a bolt-type pin or a stud-type pin or the like, for a conveyor chain of a material handling system that includes a reservoir and at least one channel formed at a head portion of the pin. The reservoir receives lubricant at the head of the pin and the channel or channels distribute the lubricant to the joint of the conveyor chain.

According to an aspect of the present invention, a pin element for connecting chain links together to form a section of a chain for conveying products along a conveyor line or path includes a shaft portion and an end or head portion at at least one end of the shaft portion. The shaft portion is configured to be received through respective chain links to define a joint of the section of chain, while the end or head portion or portions retain the pin element at the links. At least one of the end or head portions includes a reservoir and a channel formed therein. The reservoir is configured to receive a lubricant, such as from a lubricating device of the conveyor system, while the channel functions to distribute the lubricant from the reservoir and onto the shaft portion of the pin element to lubricate the joint of the chain.

According to another aspect of the present invention, a conveyor system for conveying product along a conveying path of a material handling system includes a conveyor chain and a lubricating device. The conveyor chain is movable along a conveying path and has a plurality of chain links and a plurality of chain pins or pin elements connecting respective sets of the chain links together. The pin elements have at least one head portion and a shaft portion. The head portion has a reservoir and at least one channel formed in a surface of the head portion. The channel or channels extend along the surface between the reservoir and at least one perimeter edge of the surface of the head portion. The lubricating device is positioned along the conveying path and is operable to dispense lubricating fluid onto the conveyor chain as the conveyor chain moves along the conveying path. The reservoir is configured to receive lubricating fluid from the lubricating device. The channel or channels is/are configured to direct the flow of the lubricating fluid from the reservoir to the perimeter edge/edges and onto the shaft portion of the pin element of the conveyor chain.

According to another aspect of the present invention, a method of lubricating a chain of a material handling system includes providing a conveyor chain having a plurality of chain links and a plurality of chain pins or pin elements connecting respective sets of the chain links together. The pin elements have a head portion and a shaft portion, and the head portion has a reservoir and at least one channel formed in a surface of the head portion. The channel extend along the surface between the reservoir and at least one perimeter edge of the surface of the head portion. The conveyor chain is moved along a conveying path. Lubricating fluid is delivered to the reservoir at the head portion of at least some of the pin elements. The lubricating fluid is received in the reservoir and the lubricating fluid is directed from the reservoir to the shaft portion of the pin element via the channel in the surface of the head portion.

Therefore, the present invention provides a chain pin or pin element for a conveyor chain that receives lubricant or oil in a reservoir formed at a head portion of the pin element and distributes the lubricant or oil onto the shaft of the pin element and, thus, onto the joint of the chain, via channels formed at the head portion. The chain pin element of the present invention thus facilitates lubrication of the joint of the chain while the chain travels along the conveying path. The lubricating device of the material handling system may dispense lubricant or oil onto the upper head portion of the chain, where the lubricant may then flow along the channels and down onto the shaft of the pin element to lubricate the joint of the conveyor chain. The present invention thus provides enhanced lubrication of the joints of a conveyor chain.

These and other objects, advantages, purposes and features of the present invention will become apparent upon review of the following specification in conjunction with the drawings.

DESCRIPTION OF THE PREFERRED EMBODIMENTS

Figure 2:
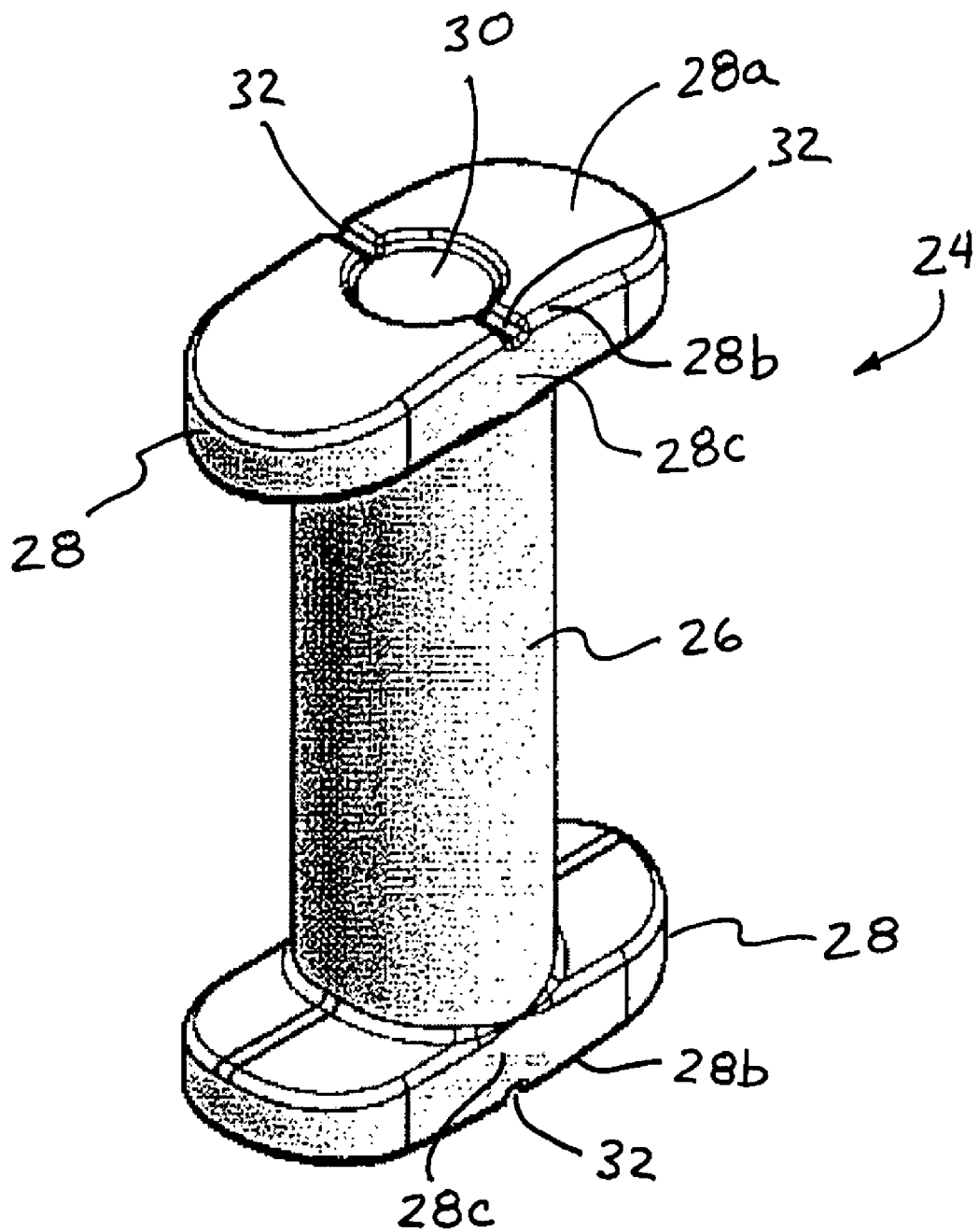
FIG. 2 is an upper perspective view of a chain pin in accordance with the present invention.

Referring now to the drawings and the illustrative embodiments depicted therein, a material handling system or conveyor system 10 includes a track or beam 12, such as an I-beam or the like, and a chain or section of chain 14 and a plurality of trolleys 16 for conveying products along the conveying system. Conveyor system 10 includes a lubricating device 18 (shown as mounted to an upper portion of the track or beam 12) for providing lubricant to the chain as the chain travels along the track or beam 12. Conveyor chain 14 includes a pair of side links 20 and a center link 22, which is connected or joined at respective side links 20 by a chain pin or pin element 24. Pin 24 includes a shaft portion 26 (FIG. 2) and an end or head portion 28 at each opposite ends of shaft portion 26. As shown in FIG. 2, head portion 28 includes a reservoir 30 formed as a recess or depression of partial cavity in an upper surface 28a of the head portion 28, and also includes at least one channel or trough 32 formed in the upper surface 28a and connecting or providing a channel or conduit between the reservoir 30 and the outer perimeter edge or perimeter region 28b of the upper surface 28a of head portion 28. The reservoir 30 receives lubricant or oil or other suitable lubricating fluid from lubricating device 18, and the channel or channels 32 guide and distribute the lubricant to the shaft portion 26 of pin 24 and thus to the joint of the conveyor chain 14, as discussed below.

Figure 1:
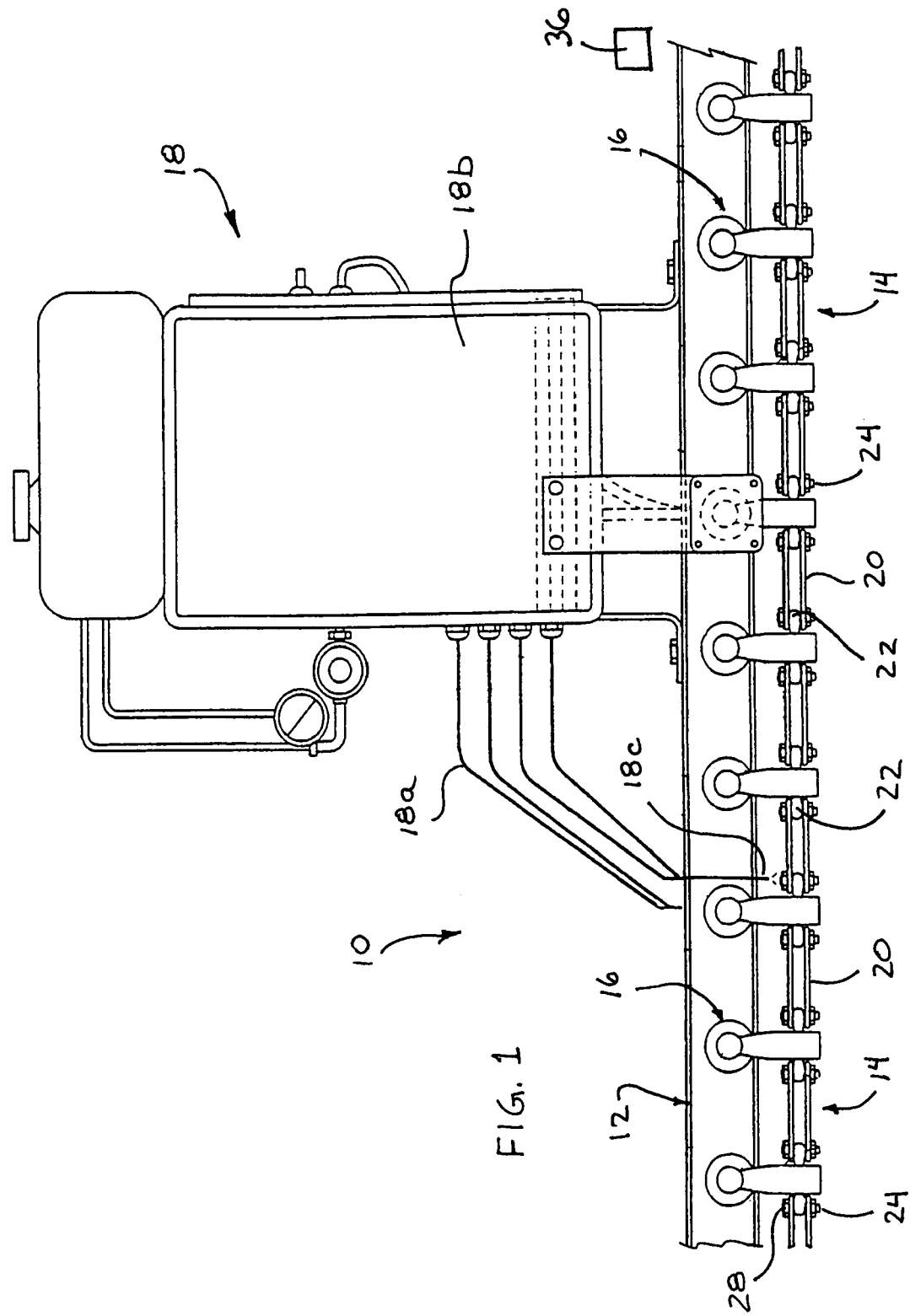
FIG. 1 is a side elevation of a portion of a material handling system having a chain and pin in accordance with the present invention.

In the illustrated embodiment, chain pin 24 comprises an I-pin (having head portions 28 at both ends of the shaft portion 26). However, the pin element may comprise any other type of pin or connecting element, such as a bolt-type pin (having a head portion at one end, such as a hexagonal shaped head portion (and such as shown in FIG. 1), and a threaded portion at the opposite end of the shaft), a stud-type pin (having threaded portions at both ends, whereby a fastener, such as a nut or the like, attached to the threaded portions and with one of the nuts or fasteners having a reservoir and channel formed thereon) or the like, without affecting the scope of the present invention.

For example, and as shown in FIG. 2, the pin or pin element may comprise a substantially symmetrically formed I-pin, with a reservoir and channels at each head portion of the pin. Optionally, the pin element may have a head portion at one end of the shaft portion that has a reservoir and channel, and a head portion at the other end of the shaft portion that has a substantially flat surface, while remaining within the spirit and scope of the present invention. Optionally, the other or opposite portion of the pin element (that is opposite from the head portion with the reservoir and channel) may be a threaded portion for receiving a threaded fastener or the like, without affecting the scope of the present invention.

Conveyor chain 12 includes multiple linkages connected together in a continuous loop about a conveying system, as is known in the art. The chain links 20, 22 are joined together by pins or pin elements 24 to form a continuous conveyor chain that connects together a plurality of trolleys or the like for moving or driving the trolleys along the conveyor track 12, such as in a known manner. The chain links and pin elements may comprise any type of chain links or pin elements, without affecting the scope of the present invention. For example, the chain links or pin elements may utilize aspects of chains such as the types commercially available in the Frost Smooth link and Frost Sani-link chains, manufactured and marketed by Frost Links, Inc. of Mich., or may utilize aspects of the chain components described in U.S. Pat. No. 6,991,094, and/or U.S. patent application Ser. No. 10/969,825, filed Oct. 21, 2004 by Frost et al. for CONVEYOR CHAIN, which are hereby incorporated herein by reference in their entireties. The chain may be connected to trolleys or the like that are driven around the conveying track (such as an I-beam track or the like) via the chain and a driving device or motor or the like.

As the chain and trolleys are moved along the conveying path, there is relative movement between the chain links and the respective pins as the chain flexes or bends while the chain negotiates curves (such as horizontal and/or vertical curves) in the conveying path. Thus, it is desirable to provide lubrication to the joints of the chain to reduce or limit wear on the pins and chain links, and to assist in keeping the rollers and chain operating smoothly. Lubricating device 18 thus is provided along the conveying path to dispense lubricant or lubricating fluid to the chain at the appropriate time and location to lubricate the joints of the chain as the chain travels along the conveying path. Lubricating device 18 of conveyor system 10 may be attached or mounted at or near the track or beam 12, such as mounted directly to a portion of the track (as shown in FIG. 1) or may be mounted to a separate platform or the like, which is positionable generally along or adjacent to the track. An example of a suitable lubricating device is described in U.S. Pat. No. 6,419,078, which is hereby incorporated herein by reference in its entirety. However, other types of lubricating devices may be utilized along the conveying path, without affecting the scope of the present invention.

As shown in FIG. 1, lubricating device 18 may include a plurality of lubricating hoses 18a extending from a dispensing device 18b of lubricating device 18. The hoses 18a are positioned and/or directed at the chain so that nozzles 18c at the ends of the hoses 18a are directed at the chain pins 24, such as at the head portions 28 of the chain pins 24 as the chain and pins travel past the lubricating device. Lubricating device 18 and hoses 18a and nozzles 18c function to directly apply lubricating fluid to the chain pins 24 of conveyor chain 14 as the chain 14 travels along the conveying path. Optionally, a sensor or detection device or system 36 (shown as a separate detection device in FIG. 1, but could be part of the lubricating device or incorporated therein or located elsewhere along the conveying path while remaining within the spirit and scope of the present invention), such as a proximity sensor or the like (or a mechanical detector or any suitable detection device that is operable to detect a moving portion of the conveyor chain as the chain is moved along the conveying path), may detect the presence of the chain pin or pins and may trigger the lubricating device 18 to dispense an appropriate amount of lubricating fluid at the appropriate time to provide lubricating fluid to the reservoir 30 of the pins 24 to lubricate the chain pins and chain joints when they are located at or near the nozzles, as discussed below. Optionally, the detection device may detect one or more characteristics of the chain or pins for measuring the chain pitch or determining or monitoring the wear in the chain or the like, as discussed below.

In the illustrated embodiment, reservoir 30 is located substantially at the center of upper surface 28a of head portion 28, with a channel or trough 32 formed in the surface 28a at each side of the reservoir 30. In the illustrated embodiment, reservoir 30 is a generally circular-shaped recess or indentation formed or established in surface 28a of head portion 28 for providing an area for collecting and receiving the lubricating fluid. Clearly, however, the reservoir may be any other shape without affecting the scope of the present invention. The lower surface or bottom of reservoir 30 may be generally planar or flat, or the bottom of the reservoir may be angled downward from the center region of the head portion and toward the side regions of the head portion so as to encourage fluid flow outward to the channels and along the channels 32 at each side region of the head portion 28. In the illustrated embodiment, the reservoir or recess or recessed portion 30 of the surface of the head portion has a circumferential wall defined by the head portion that extends circumferentially around the recessed portion, with the channel or channels 32 extending through the circumferential wall to the perimeter region of the surface of the head portion.

In the illustrated embodiment, channels 32 are provided on both sides of reservoir 30, such that the channels extend from the reservoir to the opposite perimeter sides or edges 28b of head portion 28, so as to guide and direct the lubricating fluid onto the generally vertical sides 28b of head portion 28 and onto shaft portion 26 of pin 24. As can be seen in FIG. 2, channel or groove 32 may comprise a generally V-shaped channel or groove with a generally flat bottom surface. The sidewalls of channel 32 may be angled or sloped, such as at an angle of about 30 degrees or thereabouts, relative to a perpendicular line to the top of end portion 24. The depth of the channel may be substantially the same depth as the recess or reservoir (or may optionally be a greater or lesser depth) so that the channel may substantially drain the lubricant from the reservoir. The reservoir and channel 32 shape and dimensions may vary and may be selected to suit the particular application of the conveyor pins, and to suit the lubricant used, the amount of lubricant dispensed on the pins, and/or other specific requirements to the chain or system environment.

Lubricating device 18 operates to dispense the lubricating fluid onto the head portions 28 of pins 24 of chain 14, but may also dispense lubricating fluid onto other parts of the chain and/or trolleys as the chain and trolleys travel along the conveying path. Desirably, at least one lubricating nozzle 18c is directed downward and toward the upper head portion 28 of pin 24, so that the lubricating fluid is dispensed onto the head portion 28 and received in the reservoir 30 formed in the head portion 28. The reservoir 30 thus functions to receive and at least temporarily retain lubricating fluid at the upper head portion of the chain pin 24. The channel or channels 32 substantially drain the lubricating fluid from the reservoir 30 and guide the lubricating fluid from the reservoir 30 to the outer perimeter edge of the head portion 28, where the lubricating fluid may flow down along the sides 28c of the head portion 28 and onto the shaft portion 26 to substantially lubricate the joints of the chain. Thus, during operation of conveyor system 10 and lubricating device 18, lubricating fluid is received by reservoir 30 of head portion 28 of pin 24 and temporarily received or stored in reservoir 30, and the lubricating fluid is channeled or guided along channel or channels 32 to distribute lubricating fluid onto shaft portion 26 (and to both sides of the shaft portion via the two channels 32) of the pin 24, thereby resulting in enhanced lubrication and direct and controlled lubrication of the joints of chain 12.

Figure 3:
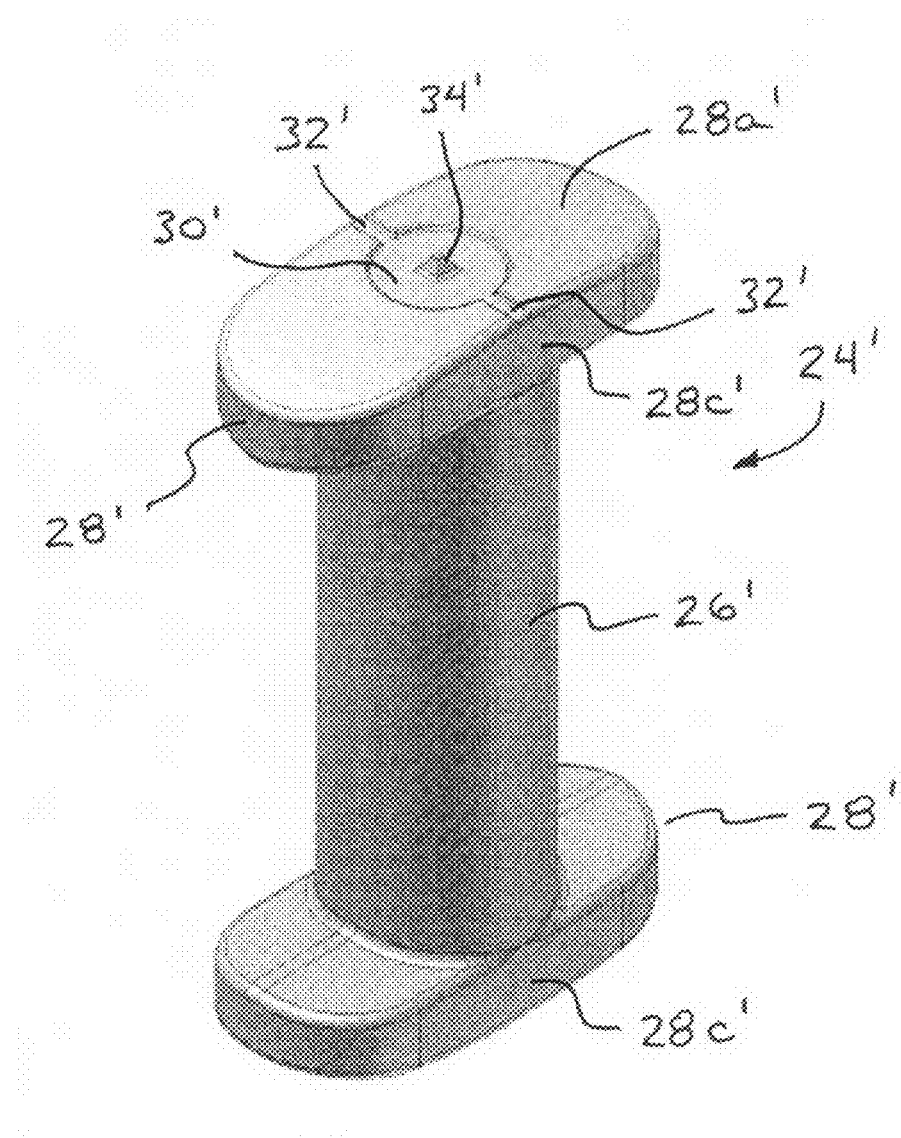
FIG. 3 is an upper perspective view of another chain pin in accordance with the present invention.

Optionally, and with reference to FIG. 3, a conveyor chain pin 24' of the present invention may include a shaft portion 26' and an end or head portion 28' at opposite ends of the shaft portion. Similar to chain pin 24, discussed above, at least one of the head portions 28' of pin 24' includes a recess 30' and channel or channels 32' formed or established at the upper or outer surface 28a' of the head portion 28'. The recess 30' and channels 32' may be substantially similar to those described above with respect to pin 24, but pin 24' includes a raised extension or projection 34' at the upper or outer surface 28a' of head portion 28', and generally within the recess 30'. Extension 34' projects upwardly or outwardly from the head portion 28' and generally in a longitudinal direction or in a direction generally along the axis of the shaft portion of the pin. Extensions 34' of pins 24' of a conveyor chain may provide a detection point or element at the conveyor chain pins, and may be used in connection with a pin detection system or chain wear detection system to detect or sense the chain pins as the chain is conveyed along the conveying path. For example, a pin detection system or chain wear measurement system or device 36 (FIG. 1) may detect the extension at the end of the pin as the chain travels along the conveying path and may determine a distance between detected pins or extensions to monitor or determine a pitch of the conveyor chain. Such a pin detection system or chain wear detection system or measurement device may utilize aspects of the pin detection/wear measurement systems described in U.S. Pat. Nos. 6,862,939 and 6,993,978, which are hereby incorporated herein by reference in their entireties. The raised extension 34' may also assist in guiding the lubricating fluid into the recess 30' and toward and along the channels 32' as the lubricating fluid is dispensed onto the upper surface of the chain pin. The recess 30' thus may receive lubricating fluid from a lubricating device and the recess 30' and channels 32' may guide and distribute the lubricating fluid to the sides 28c' of head portion 28' and onto the shaft portion 26' of pin 24' and, thus, onto the joints of the chain, such as described above. Optionally, it is envisioned that other means for measuring or monitoring the chain may be implemented, such as by utilizing aspects of the detection/measuring systems described in U.S. patent application Ser. No. 11/602,790, filed Nov. 21, 2006 by Frost et al. for MEASURING DEVICE FOR CONVEYOR CHAIN, which is hereby incorporated herein by reference in its entirety.

Figure 4:
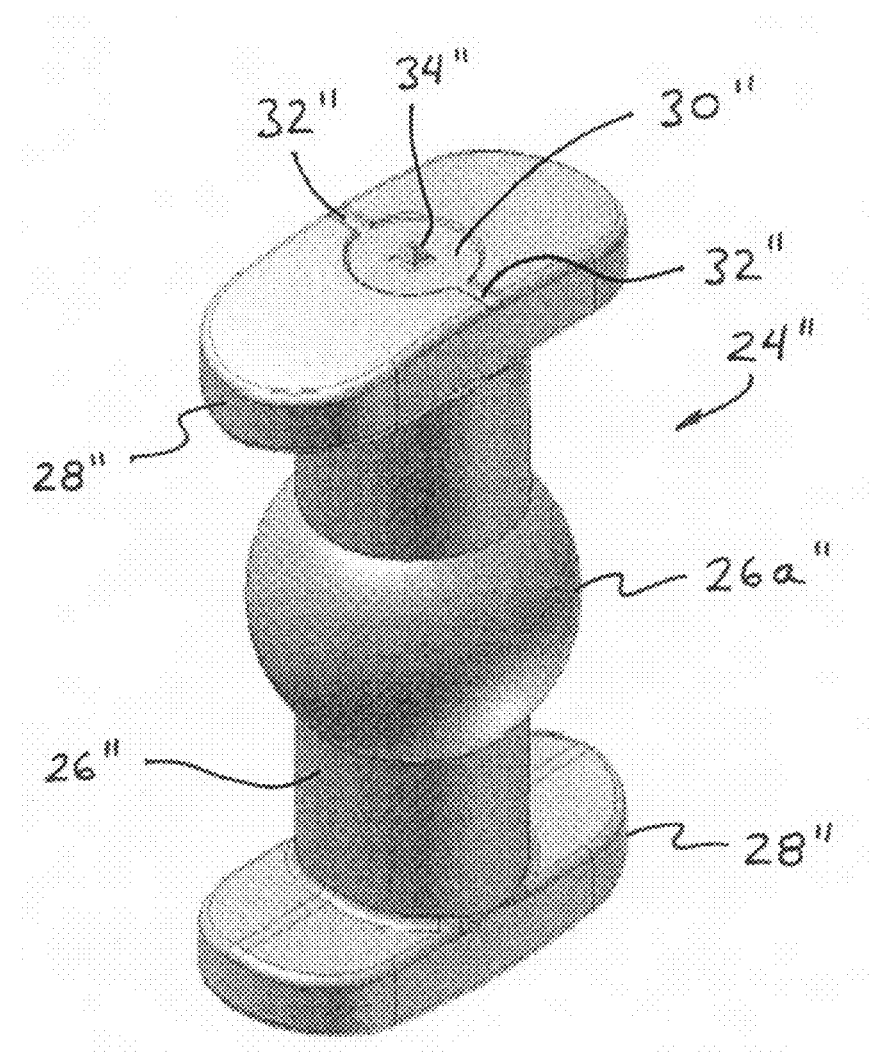
FIG. 4 is an upper perspective view of another chain pin in accordance with the present invention.

Optionally, and as shown in FIG. 4, a conveyor chain pin 24" may include a spherical member or ball member 26a" on the shaft portion 26" of the pin. The chain pin 24" and head portions 28" and recess 30", channels 32" may be otherwise substantially similar to the pins described herein, such as chain pin 24 or chain pin 24' (with an extension 34" protruding upwardly or outwardly from recess 30") discussed above, such that a detailed discussion of the other chain pin characteristics will not be repeated herein.

Figure 5:
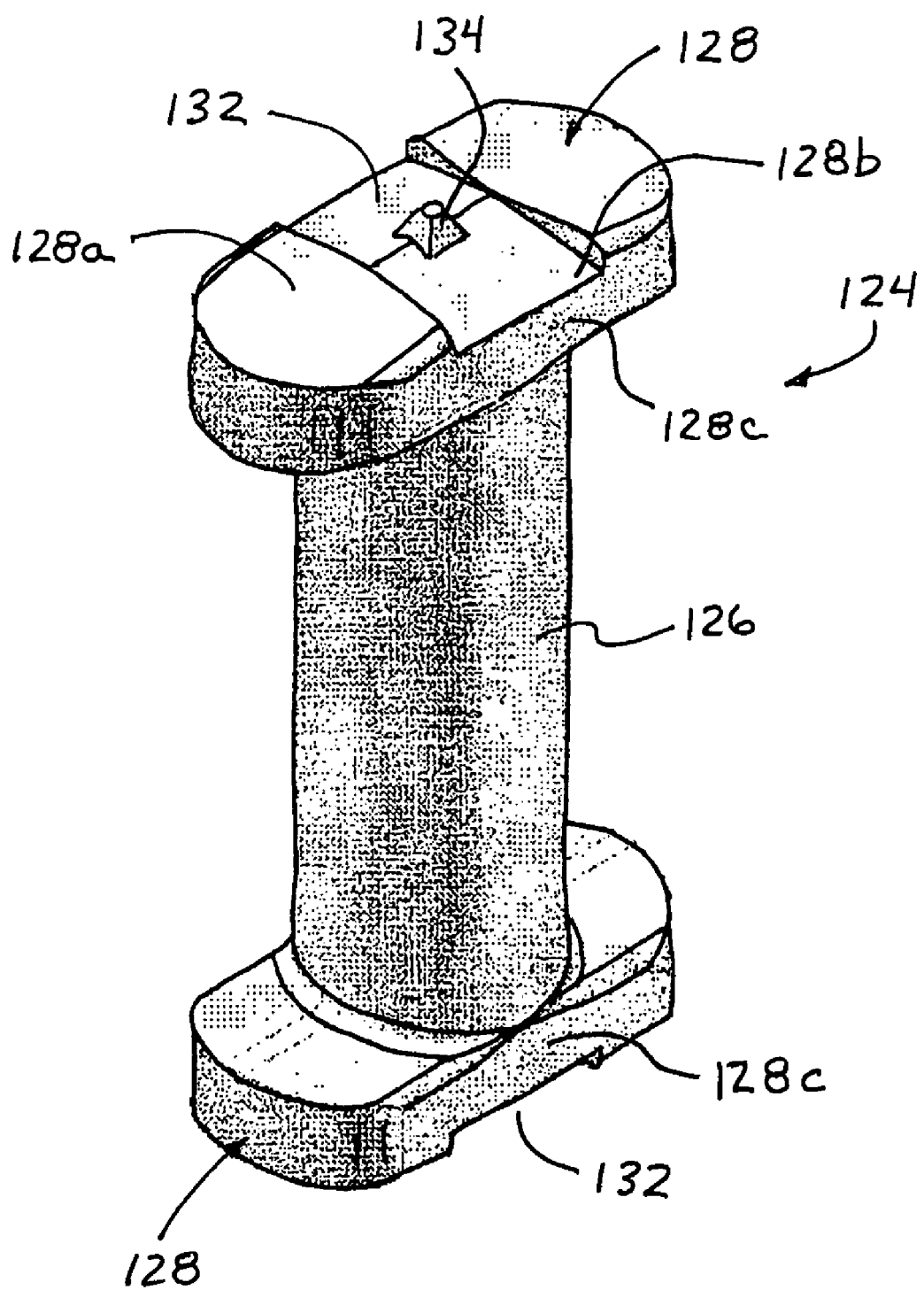
FIG. 5 is an upper perspective view of another chain pin in accordance with the present invention.

Optionally, and with reference to FIG. 5, a conveyor chain pin 124 of the present invention may include a shaft portion 126 and an end or head portion 128 at opposite ends of the shaft portion. At least one of the head portions 128 include a recess or channel 132 (in the illustrated embodiment, both head portions include a recess) formed or established at the upper or outer surface 128a of the head portion 128. The channel 132 may be formed substantially across the head portion and may have an angled lower surface or bottom that is angled or sloped downward from the center of the head portion toward the outer side regions 128b. The channel 132 thus may receive lubricating fluid from a lubricating device and may guide and distribute the lubricating fluid to the sides 128c of head portion 128 and onto the shaft portion 126 of pin 124 and, thus, onto the joints of the chain, such as described above.

In the illustrated embodiment of FIG. 5, pin 124 includes a raised extension or projection 134 at the upper or outer surface 128a of head portion 128, and generally within the recess or channel 132. Extension 134 projects upwardly or outwardly from the head portion 128. Extensions 134 of pins 124 of a conveyor chain may provide a detection point or element at the conveyor chain pins, and may be used in connection with a pin detection system or chain wear detection system to detect or sense the chain pins as the chain is conveyed along the conveying path. Such a pin detection system or chain wear detection system or measurement device is described in U.S. Pat. Nos. 6,862,939 and 6,993,978, which are hereby incorporated herein by reference in their entireties. The raised extension 134 may also assist in guiding the lubricating fluid toward and along the channels 132 as the lubricating fluid is dispensed onto the upper surface of the chain pin.

Therefore, the present invention provides a chain pin for a conveyor chain of a material handling system that includes a reservoir and channel for receiving and directing and distributing lubricating fluid to the sides of the head portions and to the shaft portion of the pin where it is most needed or desired. The present invention thus provides a pin with enhanced distribution and direction of lubricating fluid to the joints of the chain during a lubricating process, which may result in enhanced operation and longer life cycles of the conveyor system and chain.

Changes and modifications to the specifically described embodiments may be carried out without departing from the principles of the present invention, which is intended to be limited only by the scope of the appended claims, as interpreted according to the principles of patent law.

The invention claimed is:

1. A conveyor chain pin element for connecting chain links together to define a section of chain for a material handling system, said conveyor chain pin element comprising:
   a shaft portion; and
   a head portion at at least one end of said shaft portion, said head portion including a reservoir and at least one channel formed in a surface of said head portion, said surface of said head portion being opposite said shaft portion, said reservoir being configured to receive lubricating fluid therein, said at least one channel extending along said surface between said reservoir and at least one perimeter region of said surface, said at least one channel being configured to direct the flow of the lubricating fluid from said reservoir to said at least one perimeter region and toward said shaft portion of said conveyor chain pin element.

2. The conveyor chain pin element of claim 1, wherein said conveyor chain pin element includes opposite head portions, each of said head portions including said reservoir and said at least one channel.

3. The conveyor chain pin element of claim 1; wherein said at least one channel comprises a pair of channels, each of said channels extending along said surface between said reservoir and a respective perimeter region of said surface.

4. The conveyor chain pin element of claim 1 including a pin extension at said reservoir and extending outward from said surface of said head portion and in a direction generally along a longitudinal axis of said shaft portion of said chain pin element.

5. The conveyor chain pin element of claim 1, wherein said reservoir comprises a recessed portion at said surface of said head portion, said head portion defining a circumferential wall around said recessed portion, said channel extending through said circumferential wall to said at least one perimeter region of said surface.

6. A conveyor system for conveying product along a conveying path of a material handling system, said conveyor system comprising:
   a conveyor chain having a plurality of chain links and a plurality of chain pin elements connecting respective sets of said chain links together, said conveyor chain being movable along a conveying path, each of said chain pin elements having a head portion and a shaft portion, said head portion having a reservoir and at least one channel formed in a surface of said head portion, said at least one channel extending along said surface between said reservoir and at least one perimeter region of said surface;
   a lubricating device positioned along said conveying path, said lubricating device being operable to dispense lubricating fluid onto said chain pin elements of said conveyor chain as said conveyor chain moves along said conveying path; and
   said reservoir of each of said chain pin elements being configured to receive lubricating fluid from said lubricating device, said at least one channel being configured to direct the flow of the lubricating fluid from said reservoir to said at least one perimeter region and onto said shaft portion of said chain pin element.

7. The conveyor system of claim 6, wherein said at least one channel comprises a pair of channels, each of said channels extending along said surface between said reservoir and a respective perimeter region of said surface.

8. The conveyor system of claim 6 further comprising a detection device for detecting at least a portion of said conveyor chain.

9. The conveyor system of claim 8, wherein said lubricating device is operable in response to said detection device.

10. The conveyor system of claim 8, wherein at least some of said chain pin elements comprise a pin extension at said reservoir and extending outward from said surface of said head portion and in a direction generally along a longitudinal axis of said shaft portion, said detection device detecting said pin extension of said at least some of said chain pin elements.

11. The conveyor system of claim 6, wherein at least some of said chain pin elements comprise a pin extension at said reservoir and extending outward from said surface of said head portion and in a direction generally along a longitudinal axis of said shaft portion.

12. The conveyor system of claim 6, wherein said reservoir comprises a recessed portion at said surface of said head portion, said head portion defining a circumferential wall around said recessed portion, said channel extending through said circumferential wall to said at least one perimeter region of said surface.

13. A method of lubricating the joints of a conveyor chain of a material handling system, said method comprising:
   providing a conveyor chain having a plurality of chain links and a plurality of chain pin elements connecting respective sets of said chain links together, said chain pin elements having at least one head portion and a shaft portion, said head portion having a reservoir and at least one channel formed in a surface of said head portion, said at least one channel extending along said surface between said reservoir and at least one perimeter region of said surface;
   moving said conveyor chain along a conveying path to convey articles along said conveying path;

delivering lubricating fluid to said reservoir at said head portion of at least some of said chain pin elements;

receiving said lubricating fluid in said reservoir of said chain pin element; and directing said lubricating fluid from said reservoir of said chain pin element to said shaft portion of said chain pin element via said at least one channel.

14. The method of claim 13, wherein said at least one channel comprises a pair of channels, and wherein directing said lubricating fluid comprises directing said lubricating fluid from said reservoir to both sides of said shaft portion of said chain pin element via said pair of channels.

15. The method of claim 13, wherein at least some of said chain pin elements further comprise a pin extension at said reservoir and extending outward from said surface of said head portion and generally along an axis of said shaft portion.

16. The method of claim 15 further comprising detecting at least one of said pin extensions of said at least some of said chain pin elements as said conveyor chain moves along said conveying path.

17. The method of claim 16, wherein delivering lubricating fluid comprises delivering lubricating fluid in response to a detection of said at least one of said pin extensions of said conveyor chain.

18. The method of claim 13 further comprising detecting at least a portion of said conveyor chain as said conveyor chain moves along said conveying path.

19. The method of claim 18, wherein delivering lubricating fluid comprises delivering lubricating fluid in response to a detection of at least a portion of said conveyor chain.

20. The method of claim 18, wherein at least some of said chain pin elements comprise a pin extension at said reservoir and extending outward from said surface of said head portion and in a direction generally along a longitudinal axis of said shaft portion, and wherein detecting at least a portion of said conveyor chain comprises detecting said pin extension of said at least some of said chain pin elements.

* * * * *